June 20, 1933.  S. H. EARL  1,914,411
GEAR CUTTER
Filed Nov. 28, 1930   3 Sheets-Sheet 1

INVENTOR
Schuyler H. Earl
BY
his ATTORNEY

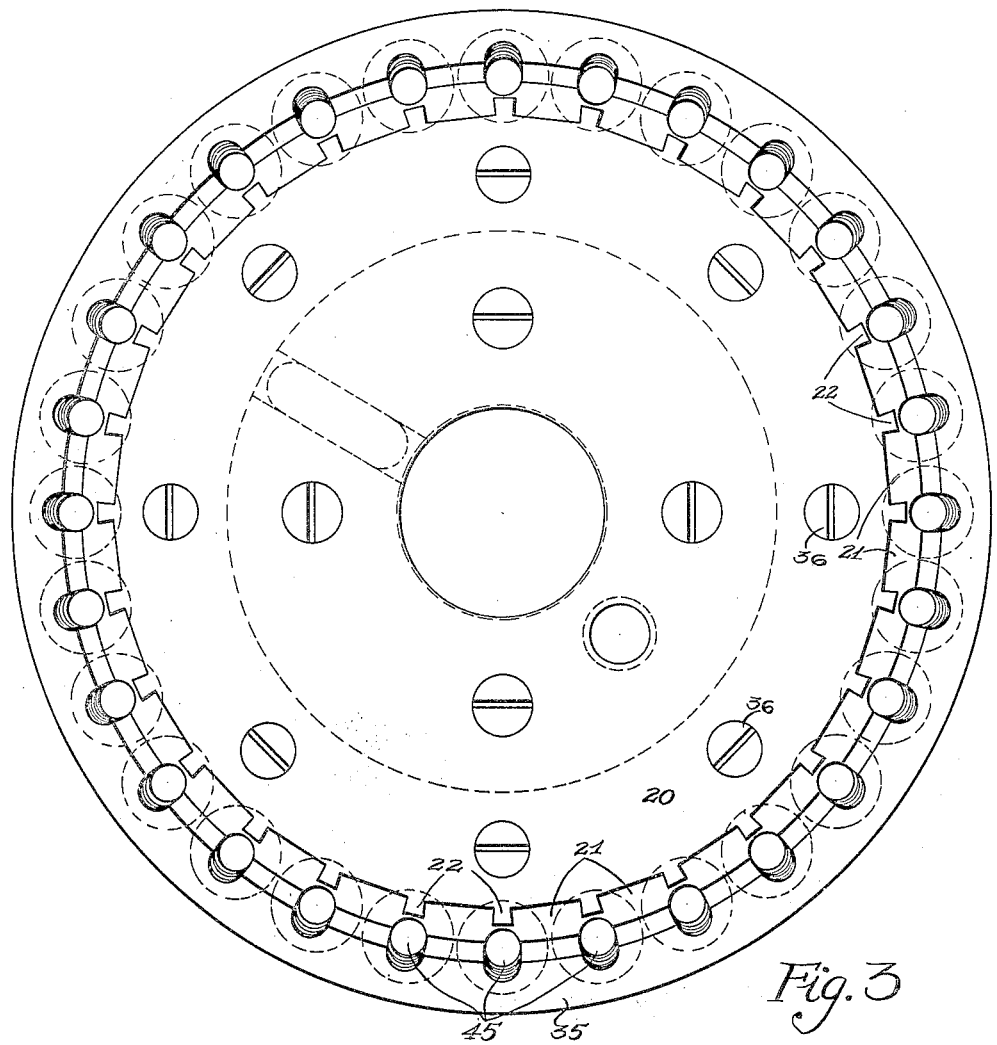
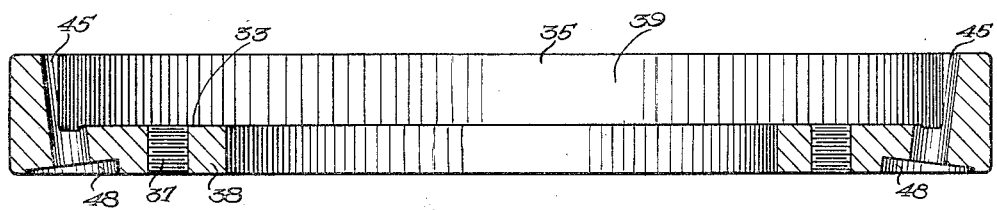

June 20, 1933.  S. H. EARL  1,914,411
GEAR CUTTER
Filed Nov. 28, 1930  3 Sheets-Sheet 3
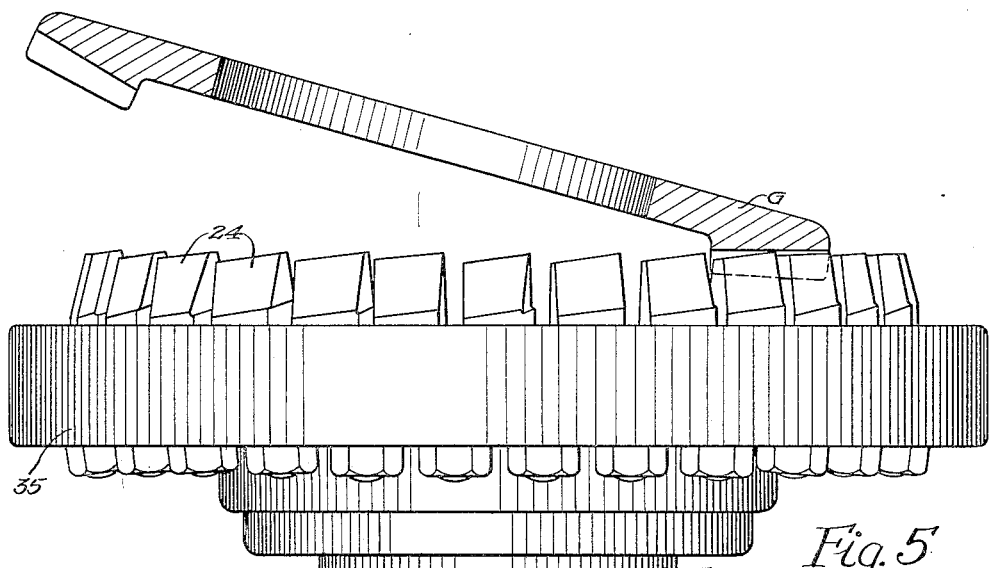
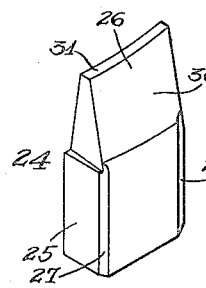
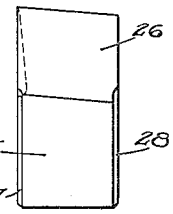
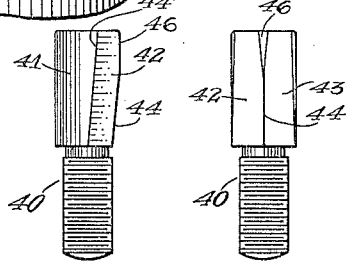
Fig.7  Fig.8  Fig.9  Fig.10
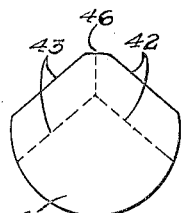
Fig.11
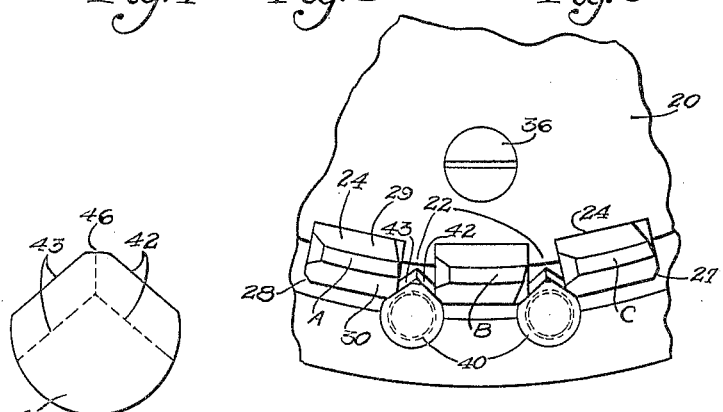
Fig.6
INVENTOR
Schuyler H. Earl
BY
his ATTORNEY Patented June 20, 1933

1,914,411

UNITED STATES PATENT OFFICE

SCHUYLER H. EARL, OF ROCHESTER, NEW YORK, ASSIGNOR TO GLEASON WORKS, OF ROCHESTER, NEW YORK, A CORPORATION OF NEW YORK

GEAR CUTTER

Application filed November 28, 1930. Serial No. 499,594.

The present invention relates to cutting tools of the inserted blade type and particularly to gear cutters for cutting longitudinally curved tooth gears. This invention may be considered an improvement on the cutter disclosed in U. S. Letters Patent No. 1,236,834 granted to James E. Gleason, August 14, 1917.

One object of this invention is to provide a gear cutter in which a greater number of blades can be secured. By employing a greater number of blades, the cutter can be used a longer time between sharpenings or a faster feed can be employed in the cutting of gears without decreasing the length of time between sharpenings.

A further object of this invention is to provide a cheaper form of cutter and one employing a simpler, less expensive type of cutting blade, a blade in which a minimum of expensive high-speed steel is wasted.

The features of the invention are especially adapted to roughing cutters, but are applicable, also, to finishing cutters.

In the drawings:

Figure 3 is a plan view of the cutter with the blades and the blade securing bolts removed;

Figure 4 is a transverse sectional view of the cutter head ring;

Figure 5 is a view showing in side elevation a cutter constructed according to this invention in operative engagement with a tapered gear blank;

Figure 6 is a fragmentary plan view of the cutter taken on an enlarged scale;

Figures 7 and 8 are a perspective view and a side elevation, respectively, of one of the cutting blades of the cutter;

Figures 9 and 10 are views of one of the blade securing bolts, these views being taken at right angles to one another; and Figure 11 is an enlarged view of one of the blade securing bolts.

Figure 1:
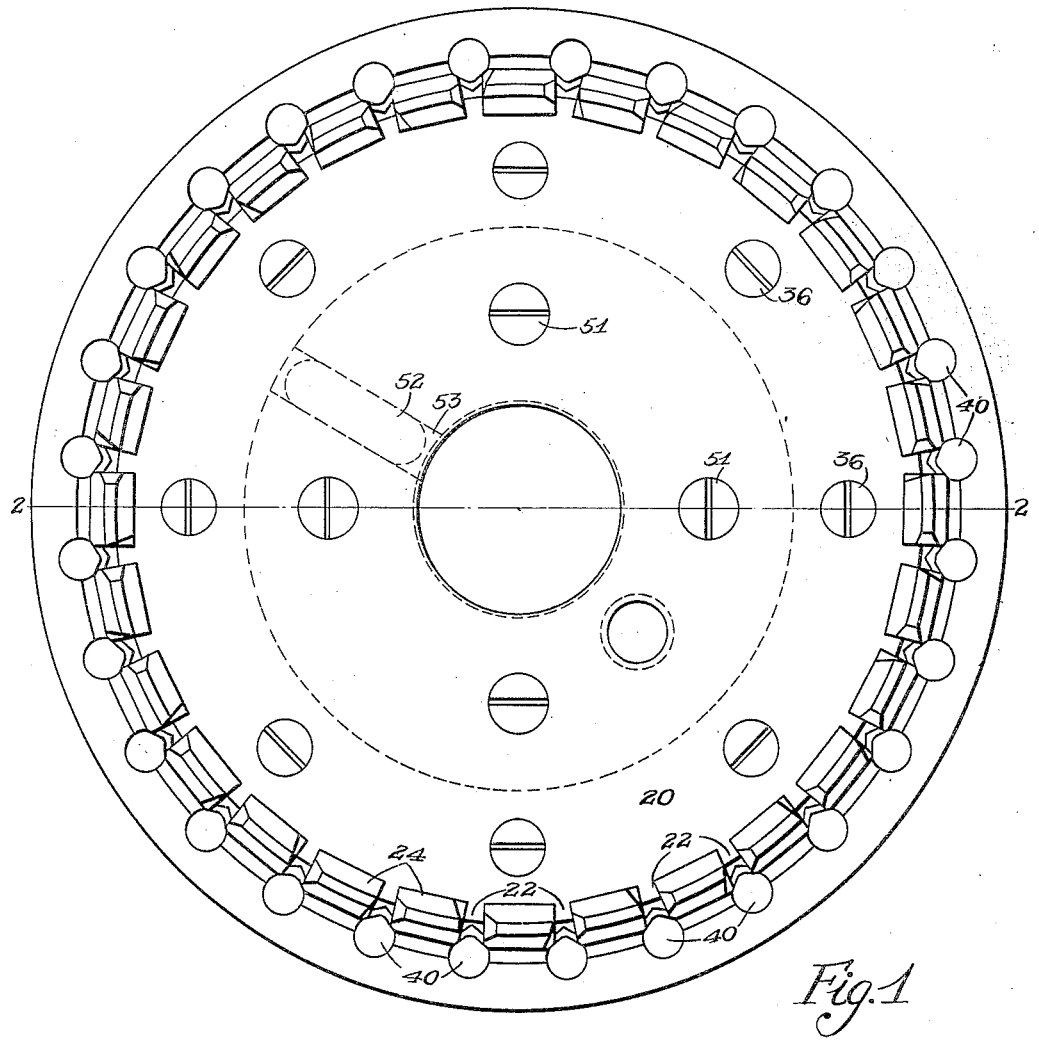
Figure 1 is a plan view of a rotary gear cutter constructed according to this invention.
Figure 2:
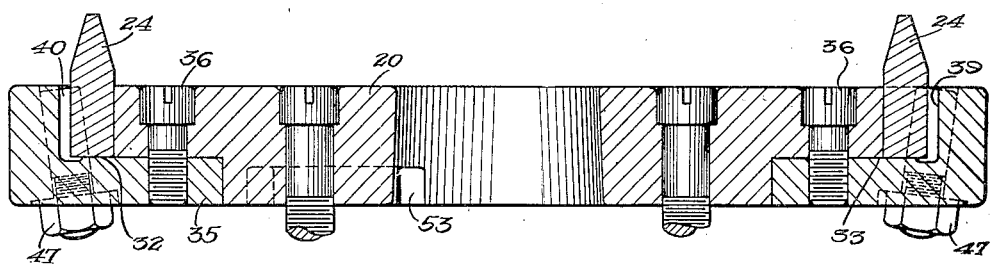
Figure 2 is a section through the cutter taken on the line 2—2 of Figure 1.

In the drawings, the invention has been illustrated as applied to a face mill gear cutter of the general type described in Patent No. 1,236,834 above referred to. It is to be understood, however, that the features of this invention are not limited to this particular type of cutter as the method of holding cutter blades which is disclosed herein may be applied to other types of inserted-blade cutting tools which have their blades extending in the general direction of their axes and in fact may be applied generally to inserted-blade cutters.

In the drawings, the cutter head of the face-mill gear cutter is designated at 20. This head 20 is formed on its periphery with a plurality of slots or grooves 21. The slots or grooves 21 are separated by tongues 22 which are left when the slots or grooves 21 are milled in the cutter head.

The cutting blades 24 of the cutter are held in the grooves 21 of the cutter head. Each of the blades 24 comprises a body portion 25 and a cutting portion 26. The body portion is generally rectangular in cross-section but has the corners at one side of the blade beveled off, as indicated at 27 and 28 in Figures 7 and 8. The sides 29 and 30 of the cutting portions of the blades converge from the body portions of the blades to the tips 31 thereof, the angle between these sides depending upon the pressure angle of the cutter. The bases 32 of the blades are flat.

The sides 29 and 30 and the tip 31 of the cutting portions of each blade are relieved from front to rear to provide the cutting clearance and in order that the clearance may be substantially uniform during the cut, the sides of the blade are preferably relieved on the arc of a circle as fully described in the Gleason patent above mentioned. Each blade may be provided with two side cutting edges or the blades may be arranged in the cutter head so that alternate blades have oppositely directed cutting edges. The latter construction has been illustrated in the drawings. Thus alternate blades are sharpened with front shear angles extending in opposite directions. In Figure 6, for instance, the blades designated at A and C have outside cutting edges while the blade designated at B has an inside cutting edge.

The blades 24 are mounted on the cutter head with their body portions 25 seated in the grooves 21 of the cutter head and their cutting portions 30 extending beyond the adjacent face of the cutter head. The plane bottom-faces 32 of the blades seat against the plane upper surface 33 of a ring member 35 which is secured to the cutter head by screws 36. This ring member serves to align all the blades so that their cutting portions 30 all extend equal distances beyond the cutter head to cut to equal depths in the gear blank. The head 20 is counterbored to receive the screws 36 and these screws thread into holes 37 tapped in the flange portion 38 of the ring.

The internal surface 39 of the annular portion of the ring is spaced slightly from the outer surfaces of the blades 24 when they are secured in position in the grooves of the cutter head. The cutting blades are held in position in the grooves and seated against the flat surface 32 of the ring by bolts 40. The cylindrical peripheral surface of the head 41 of each of these bolts is milled off to provide two converging flat surfaces 42 and 43. In milling these surfaces the axis of the bolt is inclined to the plane of the end-milling tool with the result that the surfaces 42 and 43 incline inwardly with reference to the axis of the bolt from tip to base of the head of the bolt. The lines 44 and 44' bounding the surface 42 (Figure 9) indicate the construction. The peripheral surface of the head of the bolt is left at 46 and this eliminates the otherwise sharp corner which would be formed by the converging surfaces 42 and 43.

The ring 35 is formed with spaced openings 45 which are drilled through the ring in a direction at an angle to the axis of the cutter head and the bolts 40 go into these openings 45. The bolts 40 are held in position by nuts 47 and the ring 35 is formed with countersunk openings 48 to receive these nuts.

When the ring 35 is secured to the cutter head, the openings 45 in the ring will be radially in line with the lugs 22 of the cutter head. To secure the blades 24 in the cutter head they are positioned in the grooves 21 of the cutter head with their bottom faces 32 seated on the upper face 33 of the ring. Then the bolts 40 are inserted in the openings 45 of the ring and tightened up. The slabbed-off sides 42 and 43 of each bolt will engage the adjacent beveled corners 27 and 28, respectively, of two adjoining blades of the cutter, thereby clamping the blades in the grooves of the cutter head and at the same time, because of the structure of the heads of the bolts and the inclination of the openings 45 in the ring 35 to the axis of the cutter head, the heads of the bolts 40 will draw the blades down so that they seat securely against the flat surface of the ring. Thus the blades will be held rigidly in the cutter heads with their cutting portions extending the same distance beyond the face of the head to have the same effective cutting depth. The wedging clamping action of the bolts will be the greater, too, because the bolts are tightened up by a diagonal movement and consequently the blades 24 will be clamped in the cutter head much more rigidly than would be the case were wedging bolts simply threaded into the head in a direction at right angles to the axis of the head.

It is to be noted that the cutting blades 24 do not have to have screw or bolt holes through their body portions in order that they may be secured to the cutter head. They are clamped in position solely by the action of the bolts 30 whose heads engage simultaneously two adjacent blades of the cutter head. By eliminating the bolt or screw holes through the cutting blades, expensive drilling and tapping operations are eliminated and the wastage of high speed steel is avoided. Thus the cutter blades are simpler and cheaper. They are also stronger. It is to be noted, further, that by making the grooves 21 of the cutter heads comparatively shallow a great number of blades can be carried in the cutter heads and still enough stock left in the comparatively short tongues 22 to give them the requisite strength. The tongues 22 act simply as spacers between the blades. The thrusts set up during cutting of a gear are taken wholly by the bolts. With the construction of the present invention, a cutter can be made which will carry a considerable number of blades more than a cutter such as illustrated in the Gleason patent where the blades are secured in position by individual screws or bolts and at the same time the new multiple-bladed cutter will be comparatively cheap because of the simplification in blade structure.

It is to be noted that instead of using bolts with slabbed-off heads, bolts with conically tapering heads might be used and in general such modifications in structure are contemplated as would occur to anyone skilled in the art.

Figure 5 illustrates one use of the cutter. When the ring has been assembled upon the cutter head and the blades 24 have been secured in position by the bolts 40, the cutter is ready for use. It can be secured to the spindle 50 of a gear cutting machine by screws 51 and is held against rotation relative to the cutter spindle 50 by the key 52 which engages in the key-slot 53 formed in the cutter head. G designates a bevel gear blank. When the blank G and the cutter have been brought into engagement, and the cutter is rotated, tooth spaces will be cut in the blank.

The invention is not limited to the particular embodiment shown, but is capable of modification as will be readily understood by those skilled in the art. In general, it may be said that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A gear cutter comprising a rotary head and a plurality of cutting blades each of said blades having a cutting portion and a body portion and said head having slots therein adapted to receive the body portions of the blades, a ring surrounding said blades and secured to the head, and securing members carried by the ring for securing the blades in the head, each of said securing members being adapted to engage a pair of adjoining blades of the head.

2. A gear cutter comprising a rotary head and a plurality of cutting blades, each of said blades having a cutting portion and a body portion and said cutter head having slots therein adapted to receive the body portions of the blades, the body portion of each blade being beveled on its outer face at two spaced points, a ring member surrounding said blades and secured to the heads, and members secured in the ring, each of which has tapering gripping surfaces adapted to engage the adjacent tapered portions of two adjoining blades for securing the blades in the head.

3. A gear cutter comprising a rotary head and a plurality of cutting blades, each of said blades having a cutting portion and a body portion, and said cutter head having slots therein adapted to receive the body portions of the blades, the body portion of each blade being beveled on its outer face at two spaced points, a ring member surrounding said blades and secured to the head, and wedge members secured in the ring member, each of said wedge members engaging the adjoining beveled portions of two adjoining blades for securing the blades in the head.

4. A gear cutter comprising a rotary head and a plurality of cutting blades, each of said blades having a cutting portion and a body portion and said cutter head having slots therein adapted to receive the body portions of the blades, a ring member surrounding said blades and secured to the head and having openings therein inclined at an acute angle to the axis of the head, and members having tapering gripping surfaces secured in said openings and engaging the body portions of the blade to secure the blades in the head.

5. A gear cutter comprising a rotary head and a plurality of cutting blades, each of said blades having a cutting portion and a body portion and said cutter head having slots therein adapted to receive the body portions of the blades, a ring member surrounding said blades and secured to the head and having openings therein inclined at an acute angle to the axis of the head, and members having tapering gripping surfaces each of which is adapted to engage a pair of adjoining blades and each of which is secured in an opening in the ring for securing the blades in the head.

6. A gear cutter comprising a rotary head and a plurality of cutting blades, each of said blades having a cutting portion and a body portion and said cutter head having slots therein adapted to receive the body portions of the blades, the body portion of each blade being beveled on its outer face at two spaced points, a ring member surrounding said blades and secured to the head and having openings therein inclined at acute angles to the axis of the head, and bolts having their heads slabbed off to provide two converging faces inclined inwardly from the tip to the base of the bolt-head secured in the openings of the ring and each engaging the adjoining beveled surfaces of two adjoining blades for securing the blades in the cutter head.

7. A gear cutter comprising a rotary head and a plurality of cutting blades, each of said blades having a cutting portion and a body portion, the body portion of each blade being beveled on its two outside corners, said head having slots therein adapted to receive the body portions of the blades and being formed with a plane seat perpendicular to the axis of the head and on which the bottom faces of the blades are adapted to rest and wedge members each of which is adapted to engage with the adjacent beveled portions of a pair of adjoining blades for securing the blades in the slots and against said seat.

8. A gear cutter comprising a rotary head and a plurality of cutting blades, each of said blades having a cutting portion and a body portion, the body portion of each blade being beveled on its two outside corners and said head having slots therein adapted to receive the body portions of the blades and being formed with a plane seat perpendicular to the axis of the head on which the bottom faces of the blades are adapted to rest, and wedge members secured to the head for clamping adjustment in a direction inclined to the axis of the head and the plane of the seat, each of said wedge members being adapted to engage with the adjacent beveled portions of a pair of adjoining blades for securing the blades in the head, and each blade being held in position by a pair of wedged members which engage it at opposite sides.

9. A gear cutter comprising a rotary head and a plurality of cutting blades, each of said blades having a cutting portion and a body portion, said head having slots therein adapted to receive the body portions of the blades and being formed with a plane seat on which the bottom faces of the blades are adapted to rest, the body portions of each blade being beveled at its two outside corners, and clamping members having heads slabbed off to provide two converging faces inwardly inclined from the tip to the base of said member, said clamping members being secured to the head for clamping adjustment in a direction inclined to the axis of the head and to the plane of said seat and each clamping member being arranged to engage the adjacent beveled portions of a pair of adjoining blades for securing the blades in the head.

10. A face mill gear cutter comprising a rotary head and a plurality of cutting blades, said head being provided with a plurality of slots, each of which has two side walls, an inside and a bottom wall, and said blades fitting into said slots and having their bottom faces seated on the bottom walls of said slots, the inside and the two side walls of each of said slots lying in planes parallel to the axis of rotation of the head and the bottom wall of each of said slots lying in a plane perpendicular to the axis of rotation of the head and wedge members adapted to engage the sides of said blades and mounted in said head to be movable in a direction inclined inwardly and downwardly with reference to the axis of rotation of the head whereby to force said blades against the inside and bottom walls of said slots.

SCHUYLER H. EARL.